(12) United States Patent  
Oustry

(10) Patent No.: US 7,596,472 B2  
(45) Date of Patent: Sep. 29, 2009

(54) DEVICE FOR SYNTHESIS OF A COMPOSITE DIGITAL SIGNAL WITH EXPLICIT CONTROL OF THE FIRST THREE MOMENTS THEREOF

(75) Inventor: Francois Oustry, Grenoble (FR)

(73) Assignee: Prax Value, Grenoble (FR)

( * ) Notice: Subject to any disclaimer, the term of this patent is extended or adjusted under 35 U.S.C. 154(b) by 493 days.

(21) Appl. No.: 11/640,869

(22) Filed: Dec. 19, 2006

(65) Prior Publication Data

US 2007/0150265 A1    Jun. 28, 2007

(30) Foreign Application Priority Data

Dec. 22, 2005    (FR) .................................. 05 13190

(51) Int. Cl.
*G01S 7/36* (2006.01)

(52) U.S. Cl. ..................... 702/197; 702/69; 702/190; 702/196; 702/189; 708/404; 708/408; 708/523; 708/420; 708/304

(58) Field of Classification Search .............. 702/69, 702/190, 196, 197, 189; 708/404, 408, 523, 708/420, 300, 304

See application file for complete search history.

(56) References Cited

U.S. PATENT DOCUMENTS

| | | | | |
|---|---|---|---|---|
| 4,117,538 A | * | 9/1978 | Shrader et al. ............... 342/91 |
| 4,489,393 A | * | 12/1984 | Kawahara et al. ........... 708/420 |
| 4,750,144 A | * | 6/1988 | Wilcox ....................... 708/420 |
| 4,791,590 A | * | 12/1988 | Ku et al. ..................... 708/404 |
| 4,833,635 A | * | 5/1989 | McCanny et al. ........... 708/420 |
| 5,136,529 A | * | 8/1992 | Makie et al. ................ 702/189 |
| 6,721,693 B2 | * | 4/2004 | Oustry ....................... 702/196 |
| 7,411,619 B2 | * | 8/2008 | Hayashi ..................... 348/254 |
| 7,461,112 B2 | * | 12/2008 | Kadowaki et al. .......... 708/304 |
| 2002/0121999 A1 | * | 9/2002 | Akune et al. ............... 341/200 |
| 2004/0155972 A1 | * | 8/2004 | Hayashi ..................... 348/239 |
| 2006/0008101 A1 | * | 1/2006 | Kates ......................... 381/312 |

OTHER PUBLICATIONS

Robert F. Almgren, "Optimal Execution with Nonlinear Impact Functions and Trading-Enhanced Risk," XP-002396261, Oct. 2001, <www.math.Toronto.edu/almgren/papers/nonlin.pdf>, extracted on Aug. 23, 2006.

(Continued)

*Primary Examiner*—Carol S Tsai
(74) *Attorney, Agent, or Firm*—Oliff & Berridge, PLC

(57) ABSTRACT

The device determines the weighting coefficients to be applied to N digital source signals to form a composite signal. The first- to third-order moments of the composite signal must respectively present mean value, variance and skewness characteristics predefined by a user. The device introduces an additional variable, in the form of a weighting matrix W. The vector w being the vector of the weighting coefficients and $w^T$ the transpose of the vector w, the difference $W-ww^T$ is a positive semidefinite matrix. Moreover, the device performs linearization, around a vector $w_{ref}$ of reference weighting coefficients, of the skewness constraint on the third-order moments using a matrix $$A = \begin{bmatrix} W & w \\ w^T & 1 \end{bmatrix}$$

as further intermediate variable.

5 Claims, 1 Drawing Sheet

OTHER PUBLICATIONS

Alfred Mertins, "Boundary Filter Optimization for Segmentation-Based Subband Coding," IEEE Transactions on Signal Processing, vol. 49, No. 8, pp. 1718-1727, Aug. 2001.

Laurent El Ghaoui et al., "A Cone Complementarity Linearization Algorithm for Static Output-Feedback and Related Problems," IEEE Transactions on Automatic Control, vol. 42, No. 8, pp. 1171-1176, Aug. 1997.

Zhengji Zhao et al., "The Rduced Density Matrix Method for Electronic Structure Calculations and the Role of Three-Index Representability," XP-002396260, Oct. 16, 2003, <http://www.optimization-online.org/DB_HTML/2003/10/760.html>, extracted on Aug. 23, 2006.

J.R. Anglin et al., "Dynamics of a two-mode Bose-Einstein condensate beyond mean-field theory," Physical Review A, vol. 64, No. 013605, XP-002396255, pp. 1-9, May 30, 2001.

Campbell R. Harvey et al., "Portfolio Selection with Higher Moments," XP-002396259, Dec. 13, 2004, <http://papers.ssrn.com/sol3/papers.cfm?abstract_id=634141>, extracted on Aug. 23, 2006.

Laurent El Ghaoui et al., "Worst-Case Value-at-Risk and Robust Portfolio Optimization: A Conic Programming Approach," Operations Research, vol. 51, No. 4, XP-002396254, pp. 543-556, Jul. 2003.

* cited by examiner

DEVICE FOR SYNTHESIS OF A COMPOSITE DIGITAL SIGNAL WITH EXPLICIT CONTROL OF THE FIRST THREE MOMENTS THEREOF

BACKGROUND OF THE INVENTION

The invention relates to a device for synthesis of a composite signal from a plurality of digital source signals comprising means for determining weighting coefficients to be applied to the digital source signals for the composite signal to verify mean value and skewness constraints predefined by a user and to dispose of a minimal variance.

STATE OF THE ART

The first three moments (mean value, variance and skewness) of a digital signal constitute determinant elements of the physical properties of this signal. This is in particular the case for digital signals used for computer image generation, video signals, sounds, for radio signal synthesis, for analyzing the properties of a molecule in molecular chemistry by synthesizing a signal approaching the density of presence of the particles (fermions, electrons, ions), in the finance field, etc. . . . In the finance field, this is in particular the case for the digital signals used for synthesis of investment portfolios or for synthesis of trading strategies and optimal execution with checking of liquidity and of the market impact of trading.

Usual synthesis devices, generally integrated in a digital signal processor (DSP), generally enable a combination of source signals to be produced such that the variance of the composite signal is minimal, with the constraint of a mean value greater than or equal to a quantity specified by the synthesis operator. On the other hand, specification of a constraint on the third moment, or positive skewness constraint, on the output signal leads to a non-convex optimization problem. Solving this problem by the usual direct approaches leads to results which are very unstable and which, a priori, do not provide any guarantee on the duration of the synthesis.

For example purposes, various digital signal synthesis techniques have been proposed in different technical fields in the following articles:

- in the molecular chemistry or quantum chemistry field, the articles "Dynamics of a two-mode Bose-Einstein condensate beyond mean field theory", by J. R. Anglin et al., ITAMP, Harvard-Smithsonian Center for Astrophysics, 60 Garden Street, Cambridge Mass. 02138, (Oct. 25, 2005) and "The Reduced Density Matrix Method for Electronic Structure Calculations and the Role of Three-index Representability" by Z. Zhao et al., Journal of Chemical Physics 120 (2004), pp. 2095-2104.
- in the controller field, the article "A cone complementary linearization algorithm for static output-feedback and related problems", by L. El Ghaoui, F. Oustry, and M. Ait Rami, IEEE Trans. Autom. & Control, 42(8), August 1997.
- in the signal processing field, the article "Boundary filter optimization for segmentation-based subband coding", by Alfred Mertins, IEEE Trans. Signal Processing, vol. 49, no. 8, pp. 1718-1727, August 2001.
- in the finance field, for portfolio optimization, the article "Portfolio Selection With Higher Moments", by Campbell R. Harvey et al., The University of Texas M. D. Anderson Cancer Center (13 Dec. 2004) and, for trading, the article "Optimal execution with nonlinear impact functions and trading-enhanced risk", by Robert Almgren, Applied Mathematical Finance 10 (2003) 1-18.

OBJECT OF THE INVENTION

The object of the invention is to provide a device that does not present the shortcomings of the prior art and, more particularly, a device enabling a composite signal weighting vector to be obtained, within a reasonable time, that is stable, even in the presence of perturbations (noise, perturbations generated by tests, etc.) of the source signals.

According to the invention, this object is achieved by the fact that the device comprises means for determining the first-to third-order moments of the digital source signals and means for determining the weighting coefficients from said moments of the source signals and from the predefined mean value and skewness constraints of the composite signal, said means for determining the weighting coefficients comprising
means for introducing an additional variable in the form of a weighting matrix $W$, such that, $w$ being the vector of the weighting coefficients and $w^T$ the transpose of the vector $w$, the difference $W - ww^T$ is a positive semidefinite matrix, and
means for performing linearization of the skewness constraint on the composite signal, around a vector $w_{ref}$ of reference weighting coefficients, using a matrix $$A = \begin{bmatrix} W & w \\ w^T & 1 \end{bmatrix}$$

as further intermediate variable.

BRIEF DESCRIPTION OF THE DRAWINGS

Other advantages and features will become more clearly apparent from the following description of a particular embodiment of the invention given as a non-restrictive example only and represented in the accompanying drawings, in which FIG. 1 (single figure) illustrates a particular embodiment of a synthesis device according to the invention, in block diagram form.

DESCRIPTION OF A PARTICULAR EMBODIMENT

Figure 1:
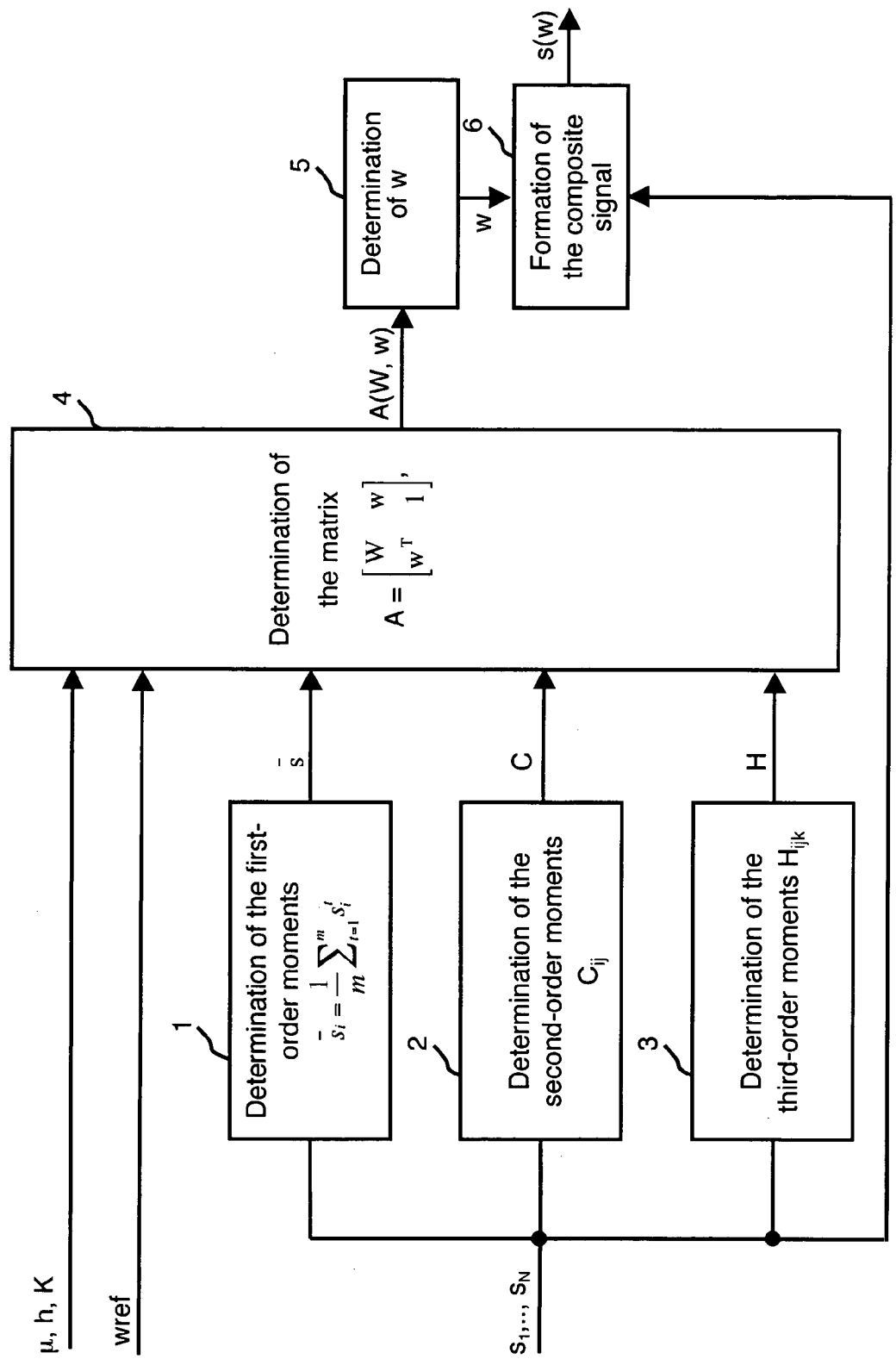

The object of the synthesis device according to FIG. 1 is synthesis of a composite signal $s(w)$ presenting a minimal variance, while verifying constraints imposing lower boundary values to the mean value and to the skewness characteristic of the composite signal. The composite signal $s(w)$ is formed from $N$ digital source signals $s_1$ to $s_N$, to which optimal weighting coefficients $w_1$ to $w_N$ to be determined are respectively applied.

For $i=1, \ldots, N$, each signal $s_i$, made up of $m$ samples $s_i^1$ to $s_i^m$, can be represented in the form of the following vector:

$$s_i = \begin{bmatrix} s_i^1 \\ \vdots \\ s_i^t \\ \vdots \\ s_i^m \end{bmatrix}$$

with a time discretization index $t=1, \ldots, m$. The digital source signal samples can represent various quantities according to the field of application involved. These quantities can in particular represent physical quantities used in the field of computer image generation, in radio signal synthesis, in molecule analysis in molecular chemistry, etc.

In like manner, the set of weighting coefficients $w_1$ to $w_N$ can be represented in the form of a weighting coefficients vector w:

$$w = \begin{bmatrix} w_1 \\ \vdots \\ w_i \\ \vdots \\ w_N \end{bmatrix}$$

in which the weighting coefficients $w_i$ are positive real numbers, such that the sum thereof is equal to 1, i.e.

$$\sum_{i=1}^{N} w_i = 1.$$

The composite signal to be synthesized is then defined by m samples $s^t(w)$, such that:

$$s^t(w) = \sum_{i=1}^{N} w_i s_i^t$$

with t=1, ..., m.

As represented in FIG. 1, the digital source signals $s_i$ are applied to the input of a block 1 for determining the first-order moments $\bar{s}_i$ of the source signals. The first-order moment 1 of a vector $s_i$, representative of the mean value of the m samples of the corresponding vector is conventionally given by the equation:

$$\bar{s}_i = \frac{1}{m} \sum_{t=1}^{m} s_i^t$$

The set of first-order moments 1 of the source signals can then be represented in the form of a vector $\bar{s}$ of first-order moments 1:

$$\bar{s} = \begin{bmatrix} \bar{s}_1 \\ \vdots \\ \bar{s}_i \\ \vdots \\ \bar{s}_N \end{bmatrix}$$

At the same time, the digital source signals $s_i$ are applied to the input of a block 2 for determining the second-order moments $C_{ij}$ of the source signals, conventionally given by the equation:

$$C_{ij} = \frac{1}{m} \sum_{t=1}^{m} (s_i^t - \bar{s}_i)(s_j^t - \bar{s}_j)$$

with i=1, ..., N and j=1, ..., N

The set of centered second-order moments $C_{ij}$ can conventionally be represented in the form of a covariance matrix C, of size N×N:

|       | $s_1$    | $s_i$    | $s_j$    | $s_N$    |
|-------|----------|----------|----------|----------|
| $s_1$ | $C_{11}$ | $C_{i1}$ | $C_{j1}$ | $C_{N1}$ |
| $s_i$ | $C_{1i}$ | $C_{ii}$ | $C_{ji}$ | $C_{Ni}$ |
| $s_j$ | $C_{1j}$ | $C_{ij}$ | $C_{jj}$ | $C_{Nj}$ |
| $s_N$ | $C_{1N}$ | $C_{iN}$ | $C_{jN}$ | $C_{NN}$ |

The digital source signals $s_i$ are moreover at the same time applied to the input of a block 3 for determining the third-order moments $H_{ijk}$ of the source signals, conventionally given by the equation:

$$H_{ijk} = \frac{1}{m} \sum_{t=1}^{m} (s_i^t - \bar{s}_i)(s_j^t - \bar{s}_j)(s_k^t - \bar{s}_k)$$

with i=1, ..., N
j=1, ..., N
k=1, ..., N

The set of third-order moments $H_{ijk}$ of the source signals can be represented in the form of a third-order tensor H which contains N slice-matrices $H_{[k]}$. Each slice-matrix $H_{[k]}$ is then formed by a matrix, of size N×N, of moments $(H_{[k]})_{ij} = H_{ijk}$, in which the index k being fixed, the indices i and j both vary from 1 to N.

The blocks 1 to 3 can be achieved in any known manner. They provide on input of a block 4 respectively the vector $\bar{s}$ of first-order moments 1, the covariance matrix C and the third-order tensor H, computed from the digital source signals $s_1$ to $s_N$.

The device has to determine the values of w which simultaneously solve the following equations:
- minimization of the variance, i.e. of the centered second-order moment $m_2(w)$ of the composite signal,
- mean value, i.e. first-order moment $m_1(w)$ of the composite signal, greater than or equal to a parameter μ previously defined by the user, and
- skewness, i.e. third-order moment $m_3(w)$ of the composite signal, greater than or equal to a parameter h previously defined by the user, in which the respectively first-, second- and third-order moments $m_1(w)$, $m_2(w)$ and $m_3(w)$ of the composite signal are respectively linear, quadratic and cubic functions of the weighting coefficients.

The first-order moment $m_1(w)$ can in fact be written in the form:

$$m_1(w) = \sum_{i=1}^{N} w_i \bar{s}_i = \bar{s}^T w$$

The centered second-order moment $m_2(w)$ can be written in the form:

$$m_2(w) = \sum_{i=1}^{N} \sum_{j=1}^{N} w_i w_j C_{ij} = w^T C w$$

The third-order moment $m_2(w)$ can be written in the form:

$$m_3(w) = \sum_{i=1}^{N} \sum_{j=1}^{N} \sum_{k=1}^{N} w_i w_j w_k H_{ijk} = \left\langle w w^T, \sum_{k=1}^{N} w_k H_{[k]} \right\rangle$$

the notation $$\langle X, Y \rangle = \sum_{i=1}^{N} \sum_{j=1}^{N} X_{ij} Y_{ij}$$

representing the scalar product between two symmetrical matrices X and Y.

The parameters µ and h are thus respectively representative of the mean value constraint and of the skewness constraint imposed on the composite signal and the device therefore has to allow synthesis of the composite signal with explicit control of its first three moments.

In the prior art, the known means only enable unstable local solutions to be obtained, the number whereof increases exponentially with the number N of source signals. In practice, for N greater than 10, there are $2^{10}$ solutions, which becomes impossible to compute within a reasonable time.

According to the invention, an additional variable is introduced. This additional variable, an additional unknown to be determined, is in the form of a positive semidefinite weighting matrix W of size N×N. It is linked to the weighting coefficients by the following inequality:

$$W - ww^T \geq 0$$

in which, $W^T$ being the transposed vector of w, i.e. $w^T = [w_1 \ldots w_i \ldots w_N]$, $ww^T = [w_i w_j]$ represents the matrix of the square of the weighting coefficients or first-order matrix associated with the vector w. An element $[w_i w_j]_{ij}$ of the matrix of the square of the weighting coefficients is thus given by $[w_i w_j]_{ij} = w_i w_j$, for i and j varying from 1 to N.

In known manner, a symmetrical matrix X, composed of real numbers $X_{ij} = X_{ji}$, for i and j varying from 1 to N, is called positive ($X \geq 0$) semidefinite when its eigenvalues, i.e. the square roots of its characteristic polynomial, are all positive or null.

In FIG. 1, the block 4 receives on input not only the parameters µ and h, but also a reference weighting coefficients vector $w_{ref}$ and a regularization coefficient K, which are also previously defined by the user.

Indeed, to obtain a stable solution, in block 4, the skewness constraint (constraint on the third-order moments) on the composite signal is in addition linearized around the reference weighting coefficients vector $W_{ref}$, formed by a set of reference weighting coefficients $w_{iref}$:

$$w_{ref} = \begin{bmatrix} w_{1ref} \\ \vdots \\ w_{iref} \\ \vdots \\ w_{Nref} \end{bmatrix}$$

This linearization uses a matrix $$A = \begin{bmatrix} W & w \\ w^T & 1 \end{bmatrix}$$

of size (N+1) (N+1), to be determined on output of the block 4, as further intermediate variable. This change of variable is equivalent to making the problem convex.

The skewness constraint on the composite signal is preferably also linearized around a reference weighting matrix $W_{ref} = w_{ref} \cdot w_{ref}^T$. It can then be written:

$$\frac{1}{2}\left\langle W_{ref}, \sum_{k=1}^{N} w_k H_{[k]} \right\rangle + \left\langle W, \sum_{k=1}^{N} w_{kref} H_{[k]} \right\rangle \geq h$$

In the particular embodiment illustrated in FIG. 1, the regularization coefficient K is introduced to regularize the variance of the composite signal. Minimization of the centered second-order moment $m_2(w)$ is then replaced by minimization of the following sum:

$$\langle W, C \rangle + \frac{K}{2}\{\|W - W_{ref}\|_F^2 + 2\|w - w_{ref}\|^2\}$$

in which the notation $\|X\|_F^2 = \langle X, X \rangle$ represents the norm associated with a matrix X and the notation $\|x\|^2 = x^T x$ the norm associated with a vector x. The term $K\{\|W-W_{ref}\|_F^2 + 2\|w-w_{ref}\|^2\}$ is a strongly convex term, which is always positive.

Thus, the initial synthesis problem having w as variable is replaced by a synthesis problem having w and W as variables, by a convexification of the constraint on the third-order moment of the composite signal, with raising of the space of the variables w into positive semidefinite matrices $W-ww^T$. Introducing the additional variable W thus enables the constraint on the third-order moment of the composite signal to be relaxed and to be linearized, i.e. transforming an initially cubic function into a linear function of the weighting coefficients. This reduces the number of possible solutions and facilitates the search for these solutions, enabling a stable solution to be obtained, within a reasonable time, even in the presence of source signal perturbations.

In the space increased in this way, the block 4 can use a positive semidefinite least squares program of known type to determine the values of the variable A that constitute solutions to the set of constraints to be respected. The search for these solutions is preferably performed by determining the dual of the linear constraints (constraints on the first- and third-order moments of the composite signal, $$w_i \geq 0 \text{ and } \sum_{i=1}^{N} w_i = 1)$$

and then applying a quasi-Newton method on the dual obtained.

Block 4 supplies the values of A to a block 5 which determines the weighting coefficients, using conventional solving methods. The output signals from block 5, representative of w, and the source signals $s_1$ to $s_N$ are supplied to a block 6, which forms the required composite signal s(w).

The invention claimed is:

1. A device for synthesis of a composite signal from a plurality of digital source signals comprising means for determining the weighting coefficients to be applied to the digital source signals for the composite signal to verify mean value and skewness constraints predefined by a user and to dispose of a minimal variance, said device comprising means for determining the first-to third-order moments of the digital source signals and means for determining the weighting coefficients from said moments of the source signals and from the predefined mean value and skewness constraints of the composite signal, said means for determining the weighting coefficients comprising means for introducing an additional variable, in the form of a weighting matrix W, such that, w being the vector of the weighting coefficients and $w^T$ the transpose of the vector w, the difference $W-ww^T$ is a positive semi-definite matrix, and means for performing linearization of the skewness constraint on the composite signal, around a vector $w_{ref}$ of reference weighting coefficients, using a matrix $$A = \begin{bmatrix} W & w \\ w^T & 1 \end{bmatrix}$$

as further intermediate variable.

2. The device according to claim 1, wherein the means for performing linearization use a reference weighting matrix $W_{ref} = w_{ref} \cdot w_{ref}^T$.

3. The device according to claim 1, wherein the means for determining the weighting coefficients comprise means for regularizing the variance of the composite signal by a strongly convex term, which is always positive, $K\{\|W-W_{ref}\|_F^2 + 2\|w-w_{ref}\|^2\}$, in which K is a regularization parameter predefined by the user.

4. The device according to claim 1, wherein the means for determining the weighting coefficients comprise means for searching for said further intermediate variable A by determining the dual of the linear constraints on the weighting coefficients and on the mean value and skewness of the composite signal.

5. The device according to claim 4, wherein said means for searching apply a quasi-Newton method on the dual of a semidefinite least squares program.

* * * * *